C. J. LARKIN AND E. F. AND E. M. FOX.
HOG OILER.
APPLICATION FILED MAY 7, 1917.
1,314,274.
Patented Aug. 26, 1919.
2 SHEETS—SHEET 1.
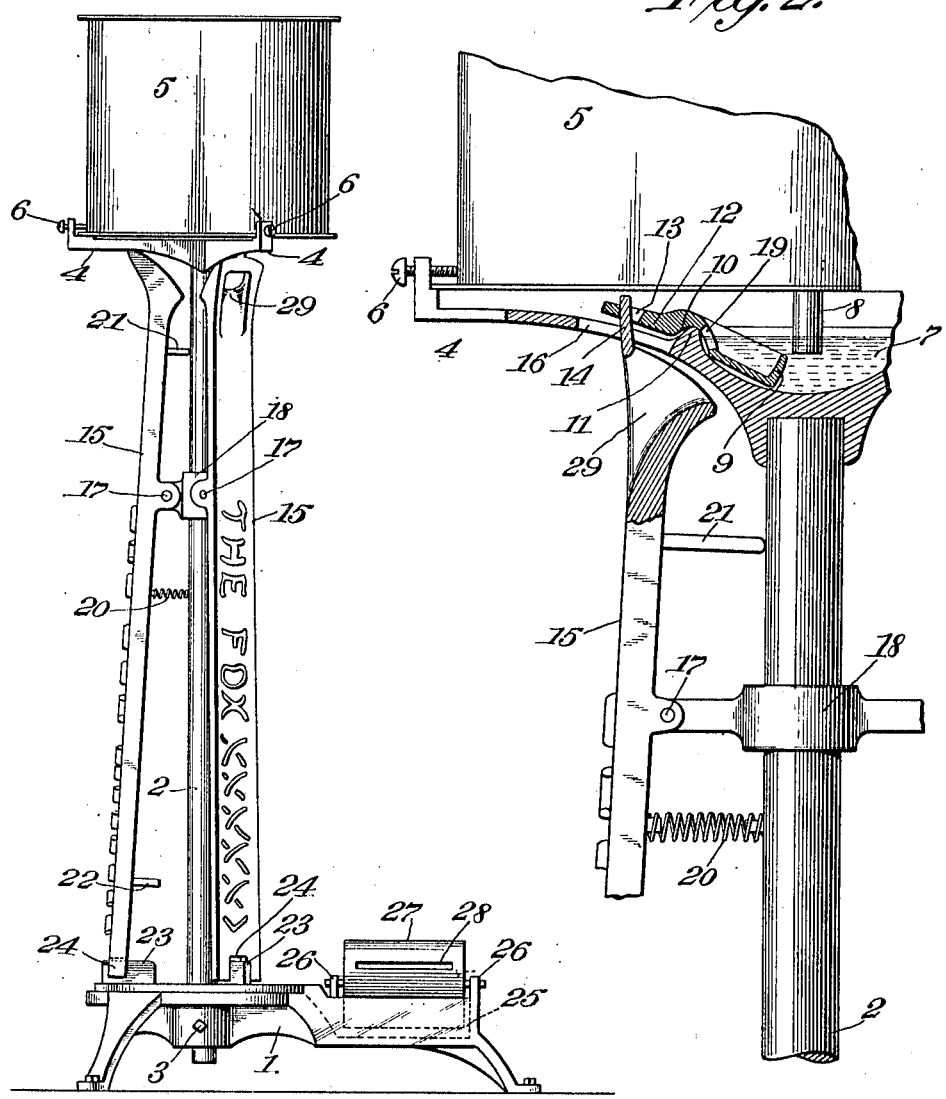
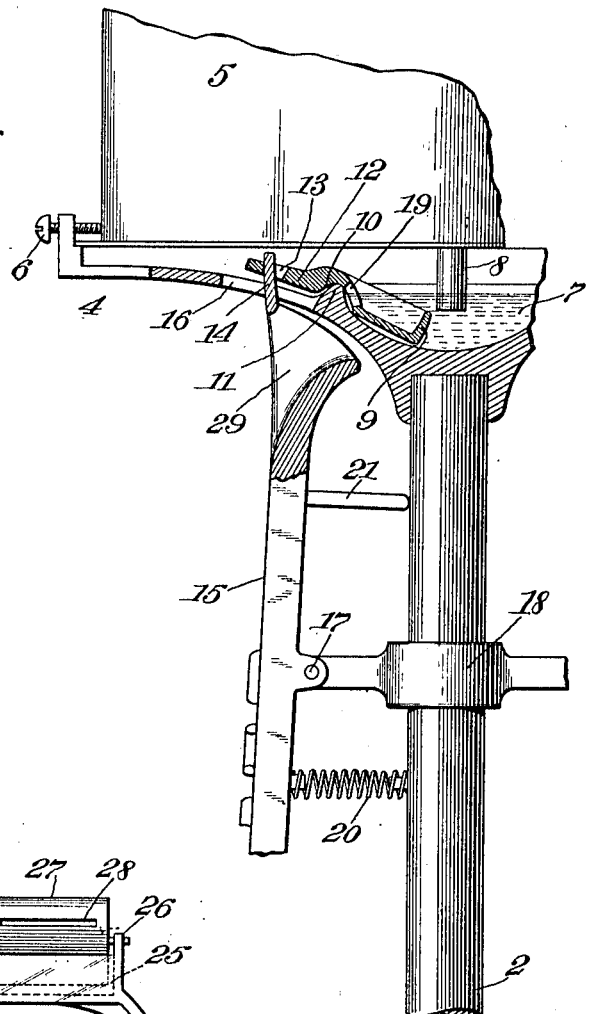
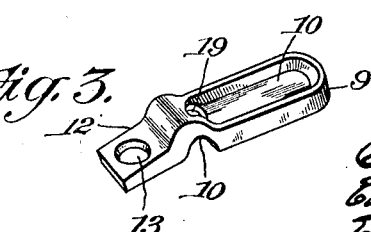

C. J. LARKIN AND E. F. AND E. M. FOX.
HOG OILER.
APPLICATION FILED MAY 7, 1917.
1,314,274.
Patented Aug. 26, 1919.
2 SHEETS—SHEET 2.
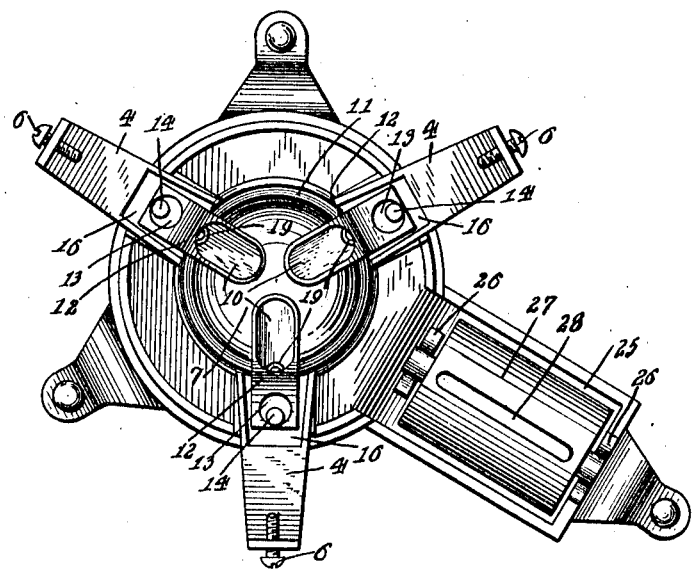
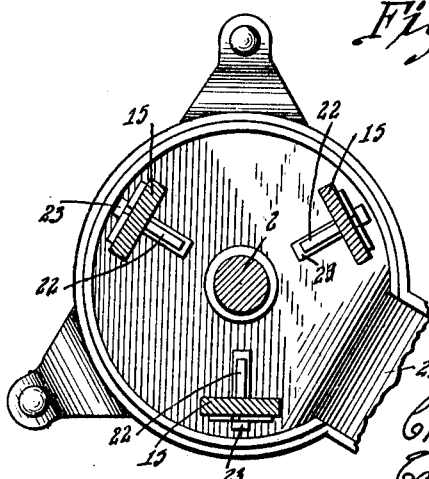

UNITED STATES PATENT OFFICE.

CHARLES J. LARKIN, OF CHEROKEE, AND EDWARD F. FOX AND ERBIE M. FOX, OF DES MOINES, IOWA; SAID LARKIN ASSIGNOR TO THE FOX CHEMICAL COMPANY, OF DES MOINES, IOWA, A CORPORATION OF IOWA.

HOG-OILER.

1,314,274.      Specification of Letters Patent.      Patented Aug. 26, 1919.

Application filed May 7, 1917. Serial No. 167,028.

*To all whom it may concern:*

Be it known that we, CHARLES J. LARKIN, EDWARD F. Fox and ERBIE M. Fox, citizens of the United States, CHARLES J. LARKIN residing at Cherokee, in the county of Cherokee and State of Iowa, and EDWARD F. Fox and ERBIE M. Fox residing at Des Moines, in the county of Polk and State of Iowa, have invented certain new and useful Improvements in Hog-Oilers, of which the following is a specification.

The present invention relates to animal actuated means for applying insecticide of liquid character to the animals which actuate it, and is more particularly intended for applying oil and the like to hogs.

One of the objects of the invention is to provide means in which the necessity of valves is eliminated to control the flow of the insecticide, said means being so constructed and arranged that small animals as well as large animals will operate the same, the relatively smaller force of the smaller animal being compensated for by increased leverage imparted to the actuating mechanism.

An embodiment of the invention that is at present considered the preferable one is illustrated in the accompanying drawings, wherein:—

Figure 1 is a side elevation of the device, and

Fig. 2 is a vertical view of the upper portion of the same, partially in section.

Fig. 3 is a detail perspective view of one of the delivering devices.

Fig. 4 is a top plan view of the well with the tank removed.

Fig. 5 is a horizontal sectional view showing the arrangement of the upper surface of the base.

Similar reference numerals designate corresponding parts in all the figures of the drawings.

In the embodiment disclosed, a base 1 is employed, from which rises a standard 2 secured in place by a set screw 3. Upon the upper end of the base is a spider comprising radiating arms 4 on which is mounted a closed reservoir tank 5 for containing the insecticide, this reservoir being held in place by suitable set screws 6. The reservoir includes a well 7, which is formed in the central portion of the spider and receives a supply from a depending spout 8 communicating with the tank 5.

Operating in the well 7 are a plurality of cups or spoons 9 having recesses 10 in their bottoms, which recesses normally receive fulcrum projections 11 formed on the arms 4 of the spider. The outer ends of the cups 9 terminate in stems 12 having openings 13 therethrough, which openings receive the upper upstanding fingers 14 of levers 15 that pass through slots 16 in the spider arms 3. These levers are grouped about the standard 2, being fulcrumed at 17 upon a bracket 18 fixed to said standard. The cups have openings 19 therethrough that open into the recesses 10.

The lower arms of the levers 15 below the fulcrum 17 constitute portions that are engaged by the animals, and these portions are preferably roughened, as indicated. Springs 20, interposed between the lower arms of the levers 15 and the standard 2, serve to urge said arms outwardly, and thus maintain the cups 19 in their depressed positions with the fulcrum projections 11 in the recesses 10.

The swinging movement of each lever 15 is limited by steps 21 and 22 located respectively above and below the fulcrum 17 and lateral movement and side strain due to the rubbing of the animals against the lower portions of the levers 15 is opposed by guides 23, which engage the forked lower ends 24 of the levers.

The upper face of the base is dished or pan-shaped and said base is provided with an extension forming a pocket 25. Journaled in this extension, as shown at 26, is a roller 27 which is hollow, and has its lower portion located in the pocket 25. A slot 28 serves to admit the liquid to the interior of the roller and permits its discharge therefrom.

With this device, it will be noted that when an animal rubs against one of the levers 15, the lower arm of said lever will be pushed inwardly and the upper arm will swing outwardly. This will cause the cup 9 connected thereto to slide outwardly, and the cam portion thereof adjacent to the recess 10 will ride upon the fulcrum projection 11, so that the cup will be elevated and the liquid contained therein will discharge through the opening 19 therein. It will then flow through the slot 16 and an opening 29 formed in the upper portion of the lever 15, and be thus directed to the outer face of the lever. Consequently, said outer face will be coated with the liquid, so that the animal rubbing thereagainst will receive an application of the insecticide. The liquid that drips from the lower end of the lever will be caught by the base and directed into the pocket 25. Consequently an animal that rubs over the roller 27 will cause said roller to revolve and carry the liquid thereupon, so that said roller will also constitute applying means.

It will be noted that with this structure there are no valves controlling the supply, but that upon each operation a predetermined amount of the liquid is elevated from the well, and delivered to the lever operated.

A further and important feature is the arrangement of the levers, so that a relatively large animal will press against the same relatively close to the fulcrum 17, while a smaller animal will engage the levers at a greater distance from the fulcrum. The consequence is that the smaller and therefore the weaker animal, will just as effectively actuate the mechanism as the larger animal.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

Having thus fully described our invention, what we claim as new, and desire to secure by Letters Patent, is:—

1. In apparatus of the character set forth, the combination with a reservoir, of a device that dips thereinto for discharging a liquid therefrom, an element on which the device has a sliding and swinging bearing to cause its elevation when slid, and animal actuating means for thus sliding said device and holding one end to cause the other to be elevated.

2. In apparatus of the character set forth, the combination with a reservoir, of a bearing element, a cup that dips into the reservoir, said cup having a cam portion slidable on the bearing element to raise and lower the cup, and animal operated means connected to the cup for sliding the same on the cam portion.

3. In apparatus of the character set forth, the combination with a standard and a reservoir supported thereon, said reservoir including a delivery well, of a bearing element disposed adjacent to the well, a cup that dips into the well and is provided with a recess in its bottom that receives the bearing element, a cam portion adjacent to the recess to cause the cup to be elevated, and an animal actuated lever connected to the cup for causing the same to slide upon the bearing element so that the cam portion will ride thereon and elevate the cup.

4. In apparatus of the character set forth, the combination with a support, of a reservoir thereon having a well, a lever fulcrumed between its ends on the support and having an opening therethrough at its upper end, and an upstanding finger above the opening, a cup that dips into the well and is provided with a cam bottom, said cup having a stem provided with an opening to receive the finger, and a bearing projection on which the cam portion of the cup slides.

5. In apparatus of the character set forth, the combination with a reservoir, of an animal operated lever, a delivering device having an element at one end that dips into the reservoir and a pivotal connection between its other end and the lever, and a bearing element on which the delivering device has a sliding bearing to permit the cup element to dip into the reservoir when the lever moves in one direction and to cause its elevation and discharge when the lever moves in an opposite direction.

6. In apparatus of the character set forth, the combination with an upstanding support, of a reservoir mounted thereon, an upstanding animal operated lever fulcrumed on and located alongside the support, a delivering device having a cup at one end that dips into the reservoir and having a direct pivotal connection between its other end and the lever, a bearing element on which the delivering device has a sliding bearing to permit the cup element to dip into the reservoir when the lever moves in one direction and to cause its elevation and discharge when the lever moves in an opposite direction, and means for directing the material discharged on to the lever.

In witness whereof, we have hereto affixed our signatures.

CHARLES J. LARKIN.
EDWARD F. FOX.
ERBIE M. FOX.

Copies of this patent may be obtained for five cents each, by addressing the "Commissioner of Patents, Washington, D. C."